(12) United States Patent
Zhang et al.

(10) Patent No.: US 7,933,464 B2
(45) Date of Patent: Apr. 26, 2011

(54) SCENE-BASED NON-UNIFORMITY CORRECTION AND ENHANCEMENT METHOD USING SUPER-RESOLUTION

(75) Inventors: Chao Zhang, Belle Mead, NJ (US); Wenyl Zhao, Mountain View, CA (US)

(73) Assignee: SRI International, Menlo Park, CA (US)

( * ) Notice: Subject to any disclaimer, the term of this patent is extended or adjusted under 35 U.S.C. 154(b) by 861 days.

(21) Appl. No.: 11/873,151

(22) Filed: Oct. 16, 2007

(65) Prior Publication Data

US 2008/0107346 A1    May 8, 2008

Related U.S. Application Data

(60) Provisional application No. 60/852,200, filed on Oct. 17, 2006.

(51) Int. Cl.
    *G06K 9/40* (2006.01)
    *G06K 9/62* (2006.01)
(52) U.S. Cl. .................................. 382/255; 382/215
(58) Field of Classification Search .................. 382/215, 382/228, 255, 267–269, 275
    See application file for complete search history.

(56) References Cited

U.S. PATENT DOCUMENTS

| | | | | |
|---|---|---|---|---|
| 6,681,058 B1 * | 1/2004 | Hanna et al. | ...... | 382/294 |
| 6,910,060 B2 * | 6/2005 | Langan et al. | ...... | 708/819 |
| 7,684,634 B2 * | 3/2010 | Kilgore | ...... | 382/254 |

OTHER PUBLICATIONS

Bergen, J., Anadan, P., Hanna, K., R. Hingorani, "Hierarchical Model-Based Motion Estimation," Proc. European Conf. Comp. Vision, pp. 237-252 (1992).

M. Irani, S. Peleg, "Motion Analysis for Image Enhancement: Resolution, Occlusion, and Transparency," Journal of Visual Comm. and Image Repre., vol. 4, pp. 324-335 (1993).

\* cited by examiner

*Primary Examiner* — Daniel G Mariam
(74) *Attorney, Agent, or Firm* — Lowenstein Sandler PC

(57) ABSTRACT

A scene-based non-uniformity correction method super-resolution for eliminating fixed pattern noise in a video having a plurality of input images is disclosed, comprising the steps of warping each of the plurality of images with respect to a reference image to obtain a warped set of images; performing one of averaging and deblurring on the warped set of images to obtain an initial estimate of a reference true scene frame; warping the initial estimate of the reference true scene frame with respect to each of the plurality of images to obtain a set of estimated true signal images; performing a least square fit algorithm to estimate a gain image and an offset image given the set of estimated true signal images; applying the estimated gain image and estimated offset image to the plurality of images to obtain a clean set of images; and applying a super-resolution algorithm to the clean set of images to obtain a higher resolution version of the reference true scene frame.

25 Claims, 3 Drawing Sheets

SCENE-BASED NON-UNIFORMITY CORRECTION AND ENHANCEMENT METHOD USING SUPER-RESOLUTION

CROSS-REFERENCE TO RELATED APPLICATIONS

This application claims the benefit of U.S. provisional patent application No. 60/852,200 filed Oct. 17, 2006, the disclosure of which is incorporated herein by reference in its entirety.

FIELD OF THE INVENTION

The present invention relates to vision systems. More specifically, the present invention relates to a scene-based non-uniformity correction method employing super-resolution for eliminating fixed pattern noise in video sequences produced by solid state imagers, such as focal-plane arrays (FPA), in digital video cameras.

BACKGROUND OF THE INVENTION

Focal plane array, (FPA) sensors are widely used in visible-light and infrared imaging systems. More particularly, FPA's have been widely used in military applications, environmental monitoring, scientific instrumentation, and medical imaging applications due to their sensitivity and low cost. Most recently research has focused on embedding powerful image/signal processing capabilities into FPA sensors. An FPA sensor comprises a two-dimensional array of photodetectors placed in the focal plane of an imaging lens. Individual detectors within the array may perform well, but the overall performance of the array is strongly affected by the lack of uniformity in the responses of all the detectors taken together. The non-uniformity of the responses of the overall array is especially severe for infrared FPA's.

From a signal processing perspective, this non-uniformity problem can be restated as how to automatically remove fixed-pattern noise at each pixel location. The FPA sensors are modeled as having fixed (or static) pattern noise superimposed on a true (i.e., noise free) image. The fixed pattern noise is attributed to spatial non-uniformity in the photo-response (i.e., the conversion of photons to electrons) of individual detectors in an array of pixels which constitute the FPA. The response is generally characterized by a linear model:

$$z_t(x,y) = g_t(x,y) \cdot s_t(x,y) + b_t(x,y) + N(x,y), \quad (1)$$

where $N(x,y)$ is the random noise, $z_t(x,y)$ is the observed scene value for a pixel at position $(x,y)$ in an array of pixels (image) that are modeled as being arranged in a rectangular coordinate grid $(x,y)$ at time t, $s_t(x,y)$ is the true scene value (e.g., irradiance collected by the detector) at time t, $g_t(x,y)$ is the gain of a pixel at position $(x,y)$ and time t, and $b_t(x,y)$ is the offset of a pixel at position $(x,y)$ at time t. $g_t(x,y)$ can also refer to as a gain image associated with noise affecting the array of pixels, and $b(x,y,)$ the offset image of pixels associated with noise. Generally speaking, gain and offset are both a function of time, as they drift slowly along (with temperature change. One key assumption of this model is that $g_t(x,y)$ and $b_t(x,y)$ change slowly, i.e., they are constant during the period used for algorithms to recover $s_t(x,y)$. As a result, the time index for these parameters are dropped hereinafter. The task of non-uniformity correction (NUC) algorithms is to obtain $s_t(x,y)$ via estimating the parameters $g(x,y)$ and $b(x,y)$ from observed $z_t(x,y)$.

Prior art non-uniformity correction (NUC) algorithms can be grouped into two main categories: 1) calibration methods that rely on calibrating an FPA with distinct sources, e.g., distinct temperature sources in long wave infrared (LWIR), and 2) scene-based methods that require no calibration. Prior art calibration methods include two-point and one-point non-uniformity correction (NUC) techniques. Two-point NUC solves for the unknowns $g(x,y)$ and $b(x,y)$ for all the $(x,y)$ pixels in Equation 1 by processing two images taken of two distinct sources e.g., two uniform heat sources in an infrared imaging system (i.e., a "hot" source and a "cold" source), or a "light" image and a "dark" image in an optical imaging system. Since two distinct sources are hard to maintain, camera manufacturers use one source to counteract offset drift in real time application, which is often referred to one-point NUC. In a one-point NUC, gain information is stored in a lookup table as a function of temperature, which can be loaded upon update. Given the gain, Equation 1 is solved to obtain the offset $b(x,y)$. Both calibration processes need to interrupt (reset) real time video operations, i.e., a calibration needs to be performed every few minutes to counteract the slow drift of the noise over time and ambient temperature. This is inappropriate for applications such as visual systems used on a battlefield or for video surveillance.

Scene-based NUC techniques have been developed to continuously correct FPA non-uniformity without the need to interrupt the video sequence in real time (reset). These techniques include statistical methods and the registration methods. In certain statistical methods, it is assumed that all possible values of the true-scene pixel are seen at each pixel location, i.e., if a sequence of video images are examined, each pixel is assumed to have experienced a full range of values, say 20 to 220 out of a range of 0 to 255. In general, statistical methods are not computationally expensive, and are easy to implement. But statistical methods generally require many frames and tie camera needs to move in such way as to satisfy the statistical assumption.

Though relatively new, registration-based methods have some desirable features over statistical methods. Registration methods assume that when images are aligned to each other, then aligned images have the same true-scene pixel at a given pixel location. Even if a scene is moving, when a pixel is aligned in all of the images, it will have the same value. Compared to statistical methods, registration methods are much more efficient, requiring fewer frames to recover the original images. However, prior art registration methods which rely on the above assumption can break down when handle significant fix-pattern noise, particularly unstructured fixed pattern noise. The assumption of the same true-scene pixel in the aligned image can also break down when the true signal response is affected by lighting change, automatic gain control (AGC) of the camera, and random noise. Existing methods either assume identical Gaussian fixed-pattern noise or structured pattern noise with known structure.

Moreover, prior art registration methods are reliable for computing restricted types of motion fields, for example, global shift motion (translation). It is desirable for a NUC method to handle parametric motion fields, in particular, affine motion fields, where the images taken by a camera are subjected to translation, rotation, scaling, and shearing. It would also be desirable for a NUC method to enhance the true scene, such as combining several images into a higher resolution images), i.e., a super-resolution image.

Accordingly, what would be desirable, but has not yet been provided, is a NUC method for eliminating fixed pattern noise in imaging systems that can recover clean images as quickly as prior art registration-based methods, can handle unknown structured or non-structured fixed-pattern noise, can work under affine motion shifts, and can improve the quality of recovered images.

SUMMARY OF THE INVENTION

Disclosed is a method and system describing a scene-based non-uniformity correction method using super-resolution for eliminating fixed pattern noise in a video having a plurality of input images, comprising the steps of warping each of the plurality of images with respect to a reference image to obtain a warped set of images; performing one of averaging and deblurring on the warped set of images to obtain an initial estimate of a reference true scene frame; warping the initial estimate of the reference true scene frame with respect to each of the plurality of images to obtain a set of estimated true signal images; performing a least square fit algorithm to estimate a gain image and an offset image given the set of estimated true signal images; applying the estimated gain image and estimated offset image to the plurality, of images to obtain a clean set of images; and applying a super-resolution algorithm to the clean set of images to obtain a higher resolution version of the reference true scene frame. The method can further comprise the step of obtaining a new set of estimated true signal images based on the higher resolution version of the reference true scene frame; and repeating the least square fitting step, the obtaining clean set of images step, and the applying a super-resolution algorithm step a predetermined number of times to obtain more accurate versions of the estimated gain image, estimated offset image, and higher resolution version of the reference true scene frame.

The applying a super-resolution algorithm step can further comprises the step of summing a previous higher resolution version of the reference true scene frame with a value that is based on a sum over all images in the plurality of images of a difference between the clean set of images and a previous clean set of images when there exists a previous higher resolution version of the reference true scene frame; otherwise, setting the higher resolution version of the reference true scene frame to an estimated clean reference image after applying the estimated gain image and the estimated offset image to initial estimate of the reference true scene frame, the estimated clean reference image being upsampled and convoluted with a back-projection kernel. Before performing the step of warping each of the plurality of images with respect to a reference image, the method can further comprise the step of providing an initial gain image, and an initial offset image derived from a statistical non-uniformity correction algorithm; and applying the initial gain image and initial offset image to the plurality of images to obtain a second clean set of images corresponding to the plurality of images. The method outlined above can be repeated for another plurality of images different from the plurality of images taken from the video, wherein the more accurate versions of the estimated gain image is substituted for the initial gain image and the initial offset image.

SUMMARY DESCRIPTION OF THE DRAWINGS

DETAILED DESCRIPTION OF THE INVENTION

The following embodiments are intended as exemplary, and not limiting. In keeping with common practice, figures are not necessarily drawn to scale.

The present invention integrates super-resolution and a registration-based NUC in order to better handle structured fixed-pattern noise than prior art registration-based NUC methods and to recover a higher-resolution version of a plurality of true scene images $S_t(x,y)$ from $s_t(x,y)$. $S_t(x,y)$ and $s_t(x,y)$ are related by $$s_t = \{S_t \cdot h\} \downarrow s, \quad (2)$$

where "·h" denotes convolution by a blur kernel h, and $\downarrow$ s denotes a down-sampling operation by a factor s (s≧1). Substituting Eq. 2 into Eq. 1, a comprehensive imaging model that relates $S_t$ and $z_t$ is as follows:

$$z_t(x,y) = g(x,y)\{S_t(x,y)\cdot h\}\downarrow s + b(x,y) + N(x,y) \quad (3)$$

Image $s_t$ is referred to hereinafter as the true scene frame and image $z_t$ as the observed frame.

Figure 1:
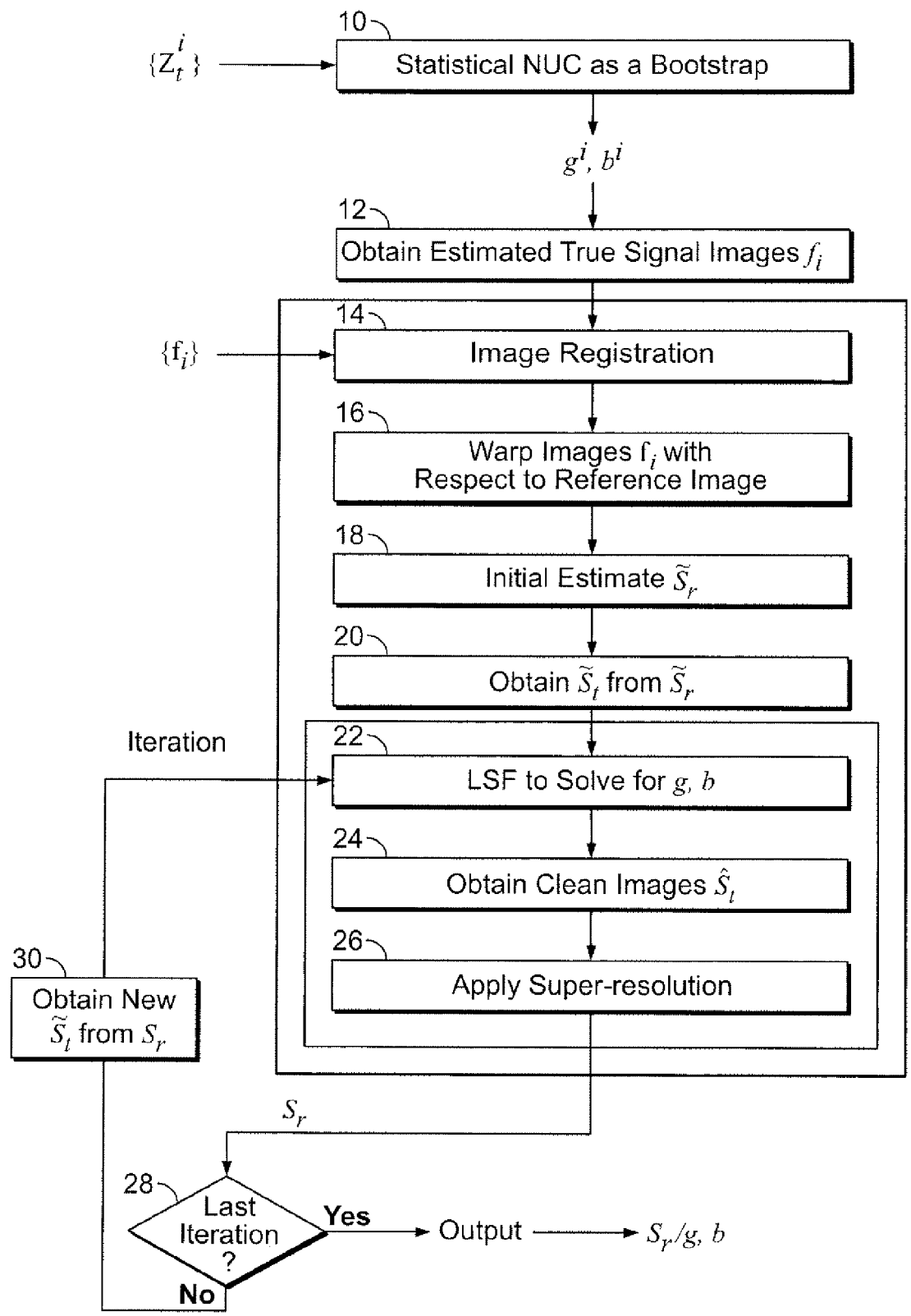
FIG. 1 is a flowchart depicting a registration-based super-resolution non-uniformity correction algorithm, constructed in accordance with an embodiment of the present invention.
Figure 2:
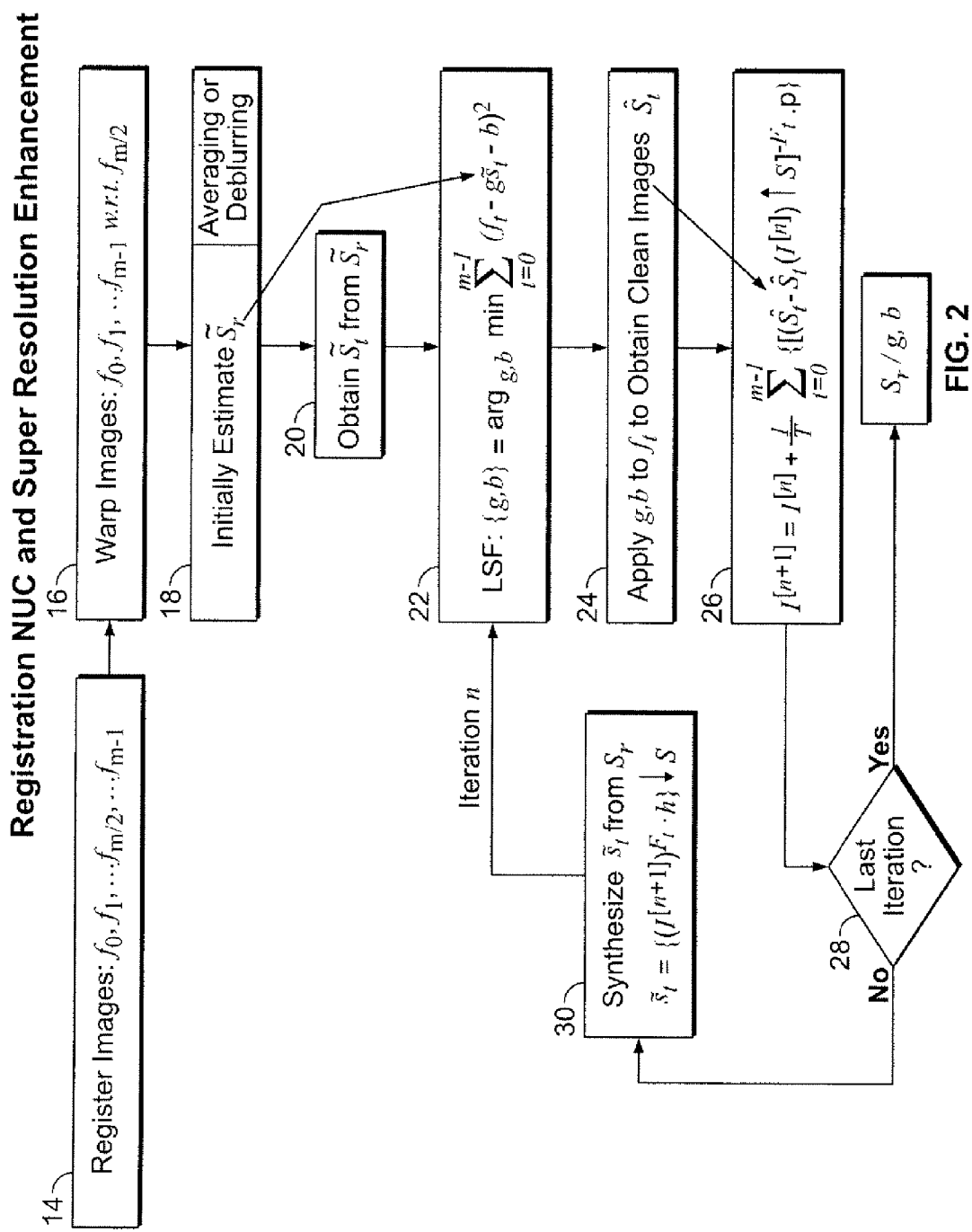
FIG. 2 is a flowchart depicting the method of FIG. 1 in greater detail.

Referring now to FIGS. 1 and 2, the steps of the present invention are illustrated. FIG. 1 presents a summary of the steps of the method of the present invention, while FIG. 2 presents the steps of the method in more mathematical detail. At step 10, an initial rough estimate of gain g(x,y) and offset b(x,y) is obtained from a non-uniformity correction algorithm (NUC). In a preferred embodiment, the NUC algorithm used for obtaining an initial estimate of gain g(x,y) and offset b(x,y) can be, but is not restricted to, a statistical-based NUC. The statistical based NUC can be, but is not limited to, a statistical method which assumes global constant statistics. Based on this assumption, the offset and gain are related to the temporal mean and standard deviation of the pixels at the pixel locations (x,y). Global constant-statistics (CS) algorithms assume that the temporal mean and standard deviation of the true signals at each pixel is a constant over space and time. Furthermore, zero-mean and unity standard deviation of the true signals $s_t(x,y)$ are assumed, such that the gain and offset at each pixel are related to mean and standard deviation by the following equations:

$$b(x, y) = m(x, y) \cong \sum_{t=0}^{T-1} \frac{z_i(x, y)}{T}, \sum_{x,y} \frac{b(x, y)}{N} = 0 \quad (4)$$

$$g(x, y) = \sigma(x, y) \cong \sqrt{\frac{\sum_{t=0}^{T-1}(z_i(x, y) - m(x, y))^2}{T-1}}, \sum_{x,y} \frac{g(x, y)}{N} = 1 \quad (5)$$

where m(x,y) is the temporal mean at (x,y) and σ(x,y) is the temporal standard deviation at (x,y). T is the number of frames, and constant N is the number of pixels.

At step 12, using. Eq. 1, and given the estimated gain g(x,y) and offset b(x,y) and a plurality of observed images $z_t(x,y)$ for a video sequence, a set of estimated "clean" true signal images $f_0, f_1, \ldots, f_{m/2}, \ldots f_{m-1}$ are obtained by inserting the observed images $z_t(x,y)$ and the gain g and offset b found in Eq. 4 and 5 into Equation 1 as follows:

$$f_t = \frac{z_t - b}{g},$$

where $f_{m/2}$ is the median estimated true scene image. At step 14, each of the frames $f_i$ are registered using an image registration method, such as the hierarchical registration method detailed in Bergen, J., Anadan, P., Hanna, K., and Hingorani, R. 1992. "Hierarchical Molde-Based Based Motion Estimation," *Proc. European Conf. Comp. Vision*, pp. 237-252, which is incorporated herein by reference in its entirety. The initial "boot-strap" rough estimate of gain $g(x,y)$ and offset $b(x,y)$ obtained from a non-uniformity correction algorithm is needed so that, after "cleaning" the images $z_t(x,y)$ in step 12 above the "cleaned" images are clean enough to allow for accurate registration. In a preferred embodiment, $f_{m/2}$ is designated as a reference frame, from which further calculations are derived. However, any of the frames $f_n, f_1, \ldots, f_{m/2}, \ldots f_{m-1}$, can be selected as the reference frame. At step 16, each of the non-reference images are warped with respect to the reference image $f_{m/2}$. At step 18, this warped set of images are either averaged or deblurred to obtain an image $\tilde{S}_r$ which can be used as an initial estimate of the reference true scene frame $s_r$.

If the coordinate system of the reference frame is chosen as the reference coordinate system, then the reference true scene frame $s_r$ and other true scene frames $S_t$ can be related as follows $$s_r(x,y) = s_t(x + \Delta_t x, y + \Delta_t y) \tag{6}$$

where $(\Delta_t x, \Delta_t y)$ are pixel-wise motion vectors. These motion vector can represent arbitrary and parametric motion types that are different from the restricted motion types assumed in registration-based NUC methods. Equation 6 can be replaced with a concise notation based on forward image warping as follows $$s_t = s_r^{W_t} \tag{7}$$

where $W_t$ is the warping vector $(-\Delta_t x, -\Delta_t y)$.

The task of the method of the present invention is to recover the high-resolution image $S_r$ given observed frames $z_t$. Based on the imaging model (Eq. 3), the remainder of the method is concerned with obtaining an optimal solution to a least square fitting problem:

$$\{S_r^*, g^*, b^*\} = \arg_{S_r, g, b} \min \sum_{t=0}^{m-1} (f_i - g s_t(S_r) - b)^2 \tag{8}$$

where m is the number of frames to be examined and $s_t(S_r)$ is defined as $$s_t(S_r) = \tilde{s}_t = \{(S_r)^{F_t} \bullet h\} \downarrow s \tag{9}$$

where $F_t$ is the high resolution version of warping $W_t$, $\bullet$ is convolution, blur kernel h mentioned above, which is determined by the point spread function (PSF) of an FPA sensor type of a given manufacturer. If manufacturer information is not available, then h is assumed to be a Gaussian filter, which is defined in M. Irani and S. Peleg, "Motion Analysis for Image Enhancement: Resolution, Occlusion, and Transparency," *Journal of Visual Comm. and Image Repre.*, Vol. 4, pp. 324-335, 1.993 (hereinafter "Irani et al."). The size or number of taps of the filter used depends empirically on the severity of the fixed pattern noise being eliminated. In a preferred embodiment, the following default 5-tap filter can be used:

$$h = \frac{1}{256} \begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix}$$

Rather than solving for the three unknowns, $S_r$, g, b, at once, the unknowns are found by an iterative method given the initial estimate $\tilde{s}_r$ of $s_r$. Before applying the iterative method, the initial estimate of $\tilde{s}_r$ of $s_r$ needs to be, at step 20, warped with respect to each individual image in the initial set of images to obtain the set of estimated true signal images $\tilde{s}_t$.

Given $\tilde{s}_t$, the iterative method is as follows: At step 22, the least square fitting problem is solved to obtain an estimated gain g and offset b given the set of estimated true signal images $f_0, f_1, \ldots, f_{m/2}, \ldots f_{m-1}$, and the previous estimate of $s_r$, which is $\tilde{s}_r$. At step 24, clean images $\hat{s}_t$ are obtained by inserting, the gain g and offset b found in step 22 and the estimated true signal images $f_0, f_1, \ldots, f_{m/2}, \ldots f_{m-1}$ into Equation 1 as follows:

$$\hat{s}_t = \frac{f_i - b}{g} \tag{10}$$

At step 26, a multi-frame super-resolution method is applied to clean images $\hat{e}_t$ and a prior estimate of higher level resolution version of the reference true scene frame $S_r$ to obtain a current estimate of a higher level resolution version of the reference true scene frame $S_r$. At step 28, if this is not the last iteration (determined empirically), then at step 30, a new version of $\tilde{s}_t$ is synthesized from the current estimate of $S_r$ and steps 22-28 are repeated until the difference between the current estimate of $S_r$ and the immediate prior estimate of $S_r$ is below a predetermined (empirically estimated) threshold. The output of the method is the estimated gain g, offset b, and super-resolved reference true scene frame $S_r$.

Referring now to FIG. 2, step 26 is described in more detail. Image super-resolution can be applied in step 26 to obtain a clean, high-resolution estimate $S_r$ of $s_r$ (scale s>1) or a clean, deblurred version of $s_r$ (a special case with scale s=1). In addition, it can also be applied to obtain the initial estimate of $s_r$ through deblurring (s=1). Although several image super-resolution techniques based on signal reconstruction can be applied to the method of the present invention, in a preferred embodiment a method employing image back projection (IBP) as described in Irani et al. is employed. Using an IBP method has the benefit of reducing random noise in addition to having no restrictions on image motion.

In step 26, an iterative updated procedure is employed to apply super-resolution to obtain a bigger resolution reference image $S_r$, and to provide a means for making a decision as to whether the estimates for gain g and offset b obtained by solving the least square fitting problem in step 22 and Equation 8 is sufficient. The iterative updated procedure employs the following equation:

$$I^{[n+1]} = I^{[n]} + \frac{1}{T} \sum_{t=0}^{m-1} \{[(\hat{s}_t - \hat{s}_t(I^{[n]}) \uparrow s]^{F_t} \cdot p\} \tag{11}$$

where $I^{[n]}$ is the n-th estimate of the high resolution or deblurred version of the clean images $\hat{s}_t$, p is a back-projection kernel defined in Irani et al., "♦" is convolution, ↑ is up-sampling by a factor of s, $-F_1$ is inverse warping of a high resolution image, and $\hat{s}_t(I^{[n]})$ is defined in Equation 9. $I^{[n+1]}$ serves as an estimate for a higher resolution version of the reference image $S_r$ for the present iteration. At step 30, for the next iteration, the next set of estimated true signal images $s\tilde{s}_t$ can be synthesized by substituting $I^{[n+1]}$ for $S_r$ into Equation 9.

If this is the first, iteration through steps 22-30 at n=0, then $I^{[N]}$ is set to zero in Equation 11, so that Equation 11 reduces to $$I^{(G)} = [\hat{s}_r \uparrow s] \bullet p$$

where $\hat{s}_r$ is the estimated clean reference image after applying g and b to initial estimate of the reference true scene frame $s_r$. Note that, as the number of iterations increases, the difference between $\hat{s}_t$ and $\hat{s}_t(I^{[n]})$ decreases, so that Equation 11 converges to $I^{[n+1]} \cong I^{[n]}$. Thus, if this difference is below a predetermined (empirical) threshold, then a good estimate of $S_r$, g and b are obtained.

Steps 10-36 can be repeated for another set of observed images $z_t(x,y)$ from the same video, except that the estimated gain $g(x,y)$ and offset $b(x,y)$ is obtained front the just estimated gain and offset instead of from a statistical-based NUC. This method can be repeated until all of the images in the input video have been processed.

Figure 3:
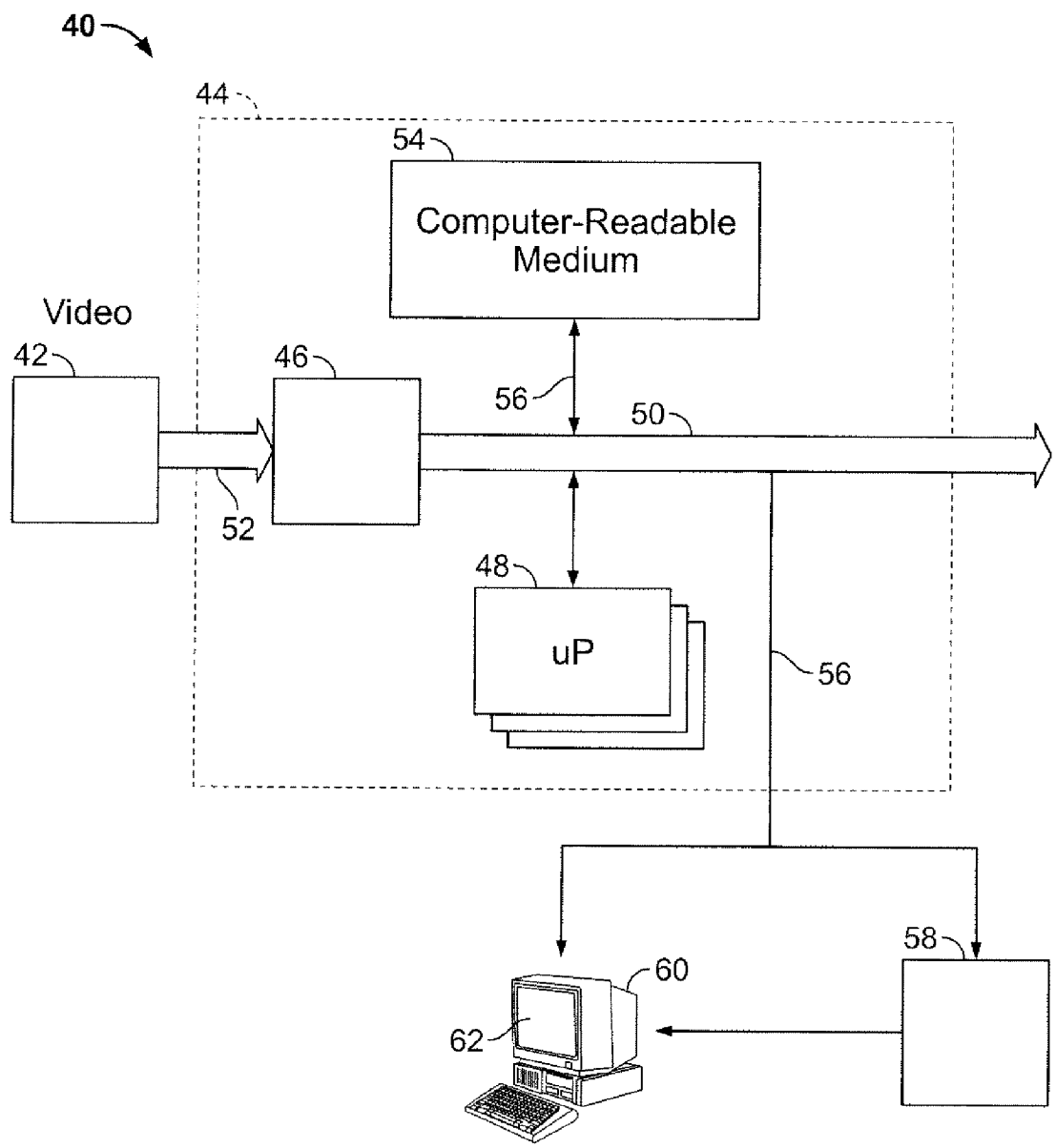
FIG. 3 is block diagram of an offline video processing system employing the method of the present invention.

In some embodiments, the method of the present invention can be incorporated directly into the hardware of a digital video camera system by means of a fiend programmable gate array (FPGA) or ASIC, or a microcontroller equipped with RAM and/or flash memory to process video sequences in real time. Alternatively, sequences of video can be processed offline using a processor and a computer-readable medium incorporating the method of the present invention as depicted in the system 40 of FIG. 3. The system 40 can include a digital video capture system 42 and a computing platform 44. The digital video capturing system 42 processes streams of digital video, or converts analog video to digital video, to a form which can be processed by the computing platform 44. The digital video capturing system may be stand-alone hardware, or cards 46 such as Firewire cards which can plug-in directly to the computing platform 44. The computing platform 44 may include a personal computer or work-station (e.g., a Pentium-M 1.8 GHz PC-104 or higher) comprising one or more processors 48 which includes a bus system 50 which is fed by video data streams 52 via the processor or directly, to a computer-readable medium 54. The computer readable medium 54 can also be used for storing the instructions of the system 40 to be executed by the one or more processors 48, including an operating system, such as the Windows or the Linux operating system. The computer readable medium 54 can include a combination of volatile memory, such as RAM memory, and non-volatile memory, such as flash memory, optical disk(s), and/or hard disk(s). In one embodiment, the non-volatile memory can include a RAID (redundant array of independent disks) system configured at level 0 (striped set) that allows continuous streaming of uncompressed data to disk without frame-drops. In such a system, a processed video data stream 56 can be stored temporarily in the computer readable medium 54 for later output. In alternative embodiments, the processed video data stream 56 can be fed in real time locally or remotely via an optional transmitter 58 to a monitor 60. The monitor 60 can display processed video data stream 56 showing a scene 62.

It is to be understood that the exemplary, embodiments are merely illustrative of the invention and that many variations of the above-described embodiments may be devised by one skilled in the art without departing from the scope of the invention. It is therefore intended that all such variations be included within the scope of the following claims and their equivalents.

What is claimed:

1. A scene-based non-uniformity correction method employing super-resolution for eliminating fixed pattern noise in a video having a plurality of input images, comprising the steps of:
    (a) warping each of the plurality of images with respect to a reference image to obtain a warped set of images;
    (b) performing one of averaging and deblurring on the warped set of images to obtain an initial estimate of a reference true scene frame;
    (c) warping the initial estimate of the reference true scene frame with respect to each of the plurality of images to obtain a set of estimated the signal images;
    (d) performing a least square fit algorithm to estimate a gain image and an offset image given the set of estimated true signal images;
    (e) applying the estimated gain image and estimated offset image to the plurality of images to obtain a clean set of images; and
    (f) applying a super-resolution algorithm to the clean set of images to obtain a higher resolution version of the reference true scene frame.

2. The method of claim 1, further comprising the steps of:
    (g) obtaining a new set of estimated true signal images based on the higher resolution version of the reference true scene frame; and
    (h) repeating steps (d)-(g) a predetermined number of times to obtain more accurate versions of the estimated gain image, estimated offset image, and higher resolution version of the reference true scene frame.

3. The method of claim 2, wherein the step of applying a super-resolution algorithm in step (f) further comprises the step of summing a previous higher resolution version of the reference true scene frame with a value that is based on a sum over all images in the plurality of images of a difference between the clean set of images and a previous clean set of images when there exists a previous higher resolution version of the reference true scene frame; otherwise,
    setting the higher resolution version of the reference true scene frame to an estimated clean reference image after applying the estimated gain image and the estimated offset image to initial estimate of the reference true scene frame, the estimated clean reference image being upsampled and convoluted with a black-projection kernel.

4. The method of claim 3 wherein the step (f) further comprises the step of obtaining $$I^{[n+1]} = I^{[n]} + \frac{1}{T}\sum_{t=0}^{m-1}\left\{\left[(\hat{s}_t - \hat{s}_t(I^{[n]})\uparrow s\right]^{-F_t} \cdot p\right\}$$

Wherein n+1 is the current iteration, n is a previous iteration, $I^{[n+1]}$ is the higher resolution version of the reference true scene frame, $I^{(n)}$ is a previous higher resolution version of the reference true scene frame, p is a back-projection kernel, "●" is convolution, ↑ is up-sampling by a factor of s, $-F_t$ is inverse warping of a high resolution image, and $\hat{s}_t(I^{[n]})$ is defined as $\{(I^{[n]})^{F_t} \bullet h\} \downarrow s$ wherein $F_t$ is the high-resolution version of warping $W_t$, and h is a blur kernel, when the previous higher resolution version of the reference true scene frame exits (n>0); otherwise, setting the higher resolution version of the reference true scene frame to $I^{[0]}=[\hat{s}, \uparrow s]\bullet p$ wherein ŝ, is the estimated clean reference image after applying the estimated gain image and the estimated offset image to initial estimate of the reference true scene frame (n=0).

5. The method of claim 2, wherein the step of performing a least square fit algorithm in step (d) further comprises the step of obtaining $$\{S_r^*, g^*, b^*\} = \arg_{S_r,g,b}\min\sum_{t=0}^{m-1}(f_t - gs_t(S_r) - b)^2$$

wherein m−1 is the number of frames to be examined, $f_t$ is one of the plurality of images that are warped with respect to the reference image, g is the gain image to be estimated, b is the offset image to be estimated, and $s_t(S_r)$ is defined as $$s_t(S_r)=\{(S_t)^{F_t}\bullet h\}\downarrow s$$

wherein $S_t$ is a higher level resolution version of the reference true scene frame, $F_t$ is the high resolution version of warping $W_t$, $\bullet$ is convolution, h is a blur kernel and $\downarrow$ is downsampling by a factor of s.

6. The method of claim 2, further comprising the steps of:
(i) providing an initial gain image, and an initial offset image; and
(j) applying the initial gain image and initial offset image to the plurality of images to obtain a second clean set of images corresponding to the plurality of images, steps (i) and (j) being performed before step (a).

7. The method of claim 2, wherein step (j) further comprises obtaining $$f_i = \frac{z_i - b}{g},$$

wherein $f_i$ is one of the second set of clean images, $z_i$ is one of the plurality of images, b is the initial offset image, and g is the initial gain image.

8. The method of claim 6, wherein the initial gain image and initial offset image are obtained from a statistical non-uniformity correction algorithm.

9. The method of claim 6, wherein step (e) further comprises obtaining $$\hat{s}_t = \frac{f_i - b}{g},$$

wherein g is the estimated gain image, b is the estimated offset image, $f_t$ is one of the plurality of images, and $\hat{s}_t$ is one of the clean set of images.

10. The method of claim 6, further comprising the step of repeating steps (a)-(h) for a second plurality of images different from the plurality of images taken from the video, wherein the more accurate versions of the estimated gain image is substituted for the initial gain image and the initial offset image.

11. A system for eliminating fixed pattern noise in a video having a plurality of input images, comprising:
a video camera for providing the plurality of images; and
a processor and a memory for performing the steps of:
(a) warping each of the plurality of images with respect to a reference image to obtain a warped set of images;
(b) performing one of averaging and deblurring on the warped set of images to obtain an initial estimate of a reference true scene frame;
(c) warping the initial estimate of the reference true scene frame with respect to each of the plurality of images to obtain a set of estimated true signal images;
(d) performing a least square fit algorithm to estimate a gain image and an offset image given the set of estimated true signal images;
(e) applying the estimated gain image and estimated offset image to the plurality of images to obtain a clean set of images; and
(f) applying a super-resolution algorithm to the clean set of images to obtain a higher resolution version of the reference true scene frame.

12. The system of claim 11, wherein the processor and the memory further perform the steps of:
(g) obtaining a new set of estimated true signal images based on the higher resolution version of the reference true scene frame; and
(h) repeating steps (d)-(g) a predetermined number of times to obtain more accurate versions of the estimated gain image, estimated offset image, and higher resolution version of the reference true scene frame.

13. The system of claim 12, wherein applying a super-resolution algorithm in step (f) further comprises the step of summing a previous higher resolution version of the reference true scene frame with a value that is based on a sum over all images in the plurality of images of a difference between the clean set of images and a previous clean set of images when there exists a previous higher resolution version of the reference true scene frame; otherwise,
setting the higher resolution version of the reference true scene frame to an estimated clean reference image after applying the estimated gain image and the estimated offset image to initial estimate of the reference true scene frame, the estimated clean reference image being upsampled and convoluted with a back-projection kernel.

14. The system of claim 12, wherein the processor and the memory further perform the step of:
(i) providing an initial gain image, and an initial offset image; and
(j) applying the initial gain image and initial offset image to the plurality of images to obtain a second clean set of images corresponding to the plurality of images, steps (i) and (j) being performed before step (a).

15. The system of claim 14, wherein the initial gain image and initial offset image are obtained from a statistical non-uniformity correction algorithm.

16. The system of claim 14, further comprising the step of repeating steps (a)-(i) for a second plurality of images different from the plurality of images taken from the video,
wherein the more accurate versions of the estimated gain image is substituted for the initial gain image and the initial offset image.

17. The system of claim 14, wherein the memory and the processor are incorporated into the camera.

18. The system of claim 17, wherein the processor and the memory are implemented as a field programmable gate array.

19. The system of claim 14, wherein the processor and the memory are incorporated into a computer platform which post-processes the plurality of images from an external camera.

20. A non-transitory computer-readable medium for storing computer instructions for eliminating fixed pattern noise in a video comprising a plurality of images, that when executed by a processor causes the processor to perform the steps of:
(a) warping each of the plurality of images with respect to a reference image to obtain a warped set of images;
(b) performing one of averaging and deblurring on the warped set of images to obtain an initial estimate of a reference true scene frame;
(c) warping the initial estimate of the reference true scene frame with respect to each of the plurality of images to obtain a set of estimated true signal images;
(d) performing a least square fit algorithm to estimate a gain image and an offset image given the set of estimated true signal images;
(e) applying the estimated gain image and estimated offset image to the plurality of images to obtain a clean set of images; and
(f) applying a super-resolution algorithm to the clean set of images to obtain a higher resolution version of the reference true scene frame.

21. The computer-readable medium of claim 20, wherein the one or more processors further perform the steps of:
(g) obtaining a new set of estimated true signal images based on the higher resolution version of the reference true scene frame; and
(h) repeating steps (d)-(g) a predetermined number of times to obtain more accurate versions of the estimated gain image, estimated offset image, and higher resolution version of the reference true scene frame.

22. The computer-readable medium of claim 21, wherein applying a super-resolution algorithm in step (f) further comprises the step of summing a previous higher resolution version of the reference true scene frame with a value that is based on a sum over all images in the plurality of images of a difference between the clean set of images and a previous clean set of images when there exists a previous higher resolution version of the reference true scene frame; otherwise,
setting the higher resolution version of the reference true scene frame to an estimated clean reference image after applying the estimated gain image and the estimated offset image to initial estimate of the reference true scene frame, the estimated clean reference image being upsampled and convoluted with a back-projection kernel.

23. The computer-readable medium of claim 21, wherein the one or more processors further perform the steps of:
(i) providing an initial gain image, and an initial offset image; and
(j) applying the initial gain image and initial offset image to the plurality of images to obtain a second clean set of images corresponding to the plurality of images, steps (i) and (j) being performed before step (a).

24. The computer-readable medium of claim 23, wherein the initial gain image and initial offset image are obtained from a statistical non-uniformity correction algorithm.

25. The computer-readable medium of claim 23, further comprising the step of repeating steps (a)-(j) for a second plurality of images different from the plurality of images taken from the video, wherein the more accurate versions of the estimated gain image is substituted for the initial gain image and the initial offset image.

* * * * *